United States Patent Office 3,544,524
Patented Dec. 1, 1970

3,544,524
POLYURETHANE POLYMERS PREPARED FROM A CHAIN EXTENDER AND THE TRANSESTERIFICATION PRODUCT OF 1,6-HEXANEDIOL WITH A DIARYLCARBONATE
Erwin Müller, Leverkusen, Wilhelm Kallert, Cologne-Stammheim, and Joszef Ivanyi, Opladen, Germany, assignors to Farbenfabriken Bayer Aktiengesellschaft, Leverkusen, Germany, a corporation of Germany
No Drawing. Filed Sept. 28, 1967, Ser. No. 671,198
Claims priority, application Germany, Oct. 13, 1966, F 50,416
Int. Cl. C08g 17/13, 41/04
U.S. Cl. 260—77.5                   5 Claims

ABSTRACT OF THE DISCLOSURE

Polyurethane polymers and a process for preparing them are provided wherein 1,6-hexanediol is transesterified with a diarylcarbonate and the transesterification product is reacted with an organic polyisocyanate and a chain extending agent containing hydrogen atoms reactive with NCO groups.

---

This invention relates to polyurethane polymers suitable for the preparation of elastomeric articles and more particularly polyurethane polymers based on 1,6-hexanediol polycarbonates.

The production of cross-linked polyurethanes from high molecular weight, linear free hydroxyl-containing polyesters, diisocyanates and low molecular weight chain lengthening agents which contain at least two hydrogen atoms which are reactive with isocyanates is already known. The working up of these polyurethanes into elastomeric products can be performed by various methods. One method, for example, is based on the casting process in which linear polyester is reacted with an excess of diisocyanate, and after addition of a chain lengthening agent in a less than the stoichiometric quantity, the reaction product is poured into molds and heated.

According to another process, the mixture of the linear hydroxyl polyester and a chain lengthening agent is reacted with an excess of diisocyanate, and after granulation, the reaction product is thermoplastically shaped by heating and application of pressure.

Synthetic resins which can be used in production of manufactured articles and in which the cross-linked stage only takes place in a second stage, can also be obtained by first reacting a mixture of a linear hydroxyl polyester and a chain lengthening agent with a less than equivalent amount of diisocyanate. Products which are stable during storage and which can be milled are thereby obtained which can subsequently be cross-linked by incorporation of more diisocyanate. These stable, millable products can be cross-linked using peroxides if suitable diisocyanates, such as 4,4'-diphenylmethane diisocyanate, are used, and with sulfur or formaldehyde if suitable unsaturated chain lengthening agents are used.

Linear hydroxyl polyesters which may be used in the preparation of cross-linked polyurethanes are reaction products of aliphatic dicarboxylic acids and aliphatic glycols such as hexanediol-(1,6). An example of a dicarboxylic acid is carbonic acid. If the higher molecular weight hydroxyl compounds used are hydroxyl-containing polyesters, the resistance to hydrolysis, resistance to swelling and mechanical properties of the corresponding polyurethanes are largely determined by the structural components of the polyester. Thus, for example by reaction of a hydroxyl polyester obtained by reaction of ethylene glycol and adipic acid with diisocyanates and chain lengthening agents, one obtains cross-linked synthetic resins which have particularly good mechanical properties and show little tendency to swelling in organic solvents. These polyurethanes furthermore still show sufficient resistance to hydrolysis to be useful in many fields. Elastomers which show substantially higher resistance to hydrolysis are obtained if, instead of using an ester of ethylene glycol and adipic acid, one uses a polyester of 1,6-hexanediol and adipic acid. This hydroxyl-containing polyester, however, has a strong tendency to crystallize out, which adversely affects the behavior of polyurethanes produced from it at lower temperatures. It is therefore necessary to extend this hydroxyl polyester with diisocyanates (see German patent specifications Nos. 1,114,318 and 1,218,717) whereby urethane groups are incorporated as interference components and produce a lowering in the melting point of the hydroxy compound. This provides the necessary properties for satisfactory behavior of the resulting polyurethanes at low temperatures.

It is an object of this invention to provide improved polyurethane elastomers. It is another object of this invention to provide polyurethane elastomers having improved hydrolysis resistance. It is a further object of this invention to provide polyurethane polymers that can be processed by thermoplastic techniques.

The foregoing objects and others which will become apparent from the following description are accomplished in accordance with the invention generally speaking by providing polyurethane polymers that are the reaction product of an organic diisocyanate, a chain extending agent containing active hydrogen atoms that are reactive with NCO groups and a higher molecular weight 1,6-hexanediol polycarbonate prepared by reacting 1,6-hexanediol with a diarylcarbonate.

The polyurethanes with elastic properties produced by the process according to the invention have the particular advantage over those hitherto known of excellent resistance to hydrolysis, as well as good behavior at low temperatures and, in addition, their mechanical properties are very good. In particular, their resistance to tearing, resistance to tear propagation, and their capacity to swell in organic hydrocarbons is less than that of elastomers based on polyethers.

Surprisingly, it is specifically the reaction products obtained from hexanediol-(1,6) and diarylcarbonates which lead to the production of such high quality cross-linked elastic polyurethanes. If the hydroxypolyesters used are polycarbonates obtained by other methods, e.g. from hexanediol-(1,6) and phosgene, chloroformic acid ester or dialkylcarbonates, or polycarbonates obtained from other glycols and diarylcarbonates, the polyurethanes obtained have less satisfactory properties.

The preparation of the 1,6-hexanediol-polycarbonate used in the process according to the present invention as the hydroxypolyester is carried out by reacting 1,6-hexanediol with a diarylcarbonate such as diphenylcarbonate, ditolycarbonate, or dinaphthylcarbonate, either by heating the reactants alone or with the use of ester interchange catalysts. Preferably, diphenylcarbonate is used. Polycarbonates of different higher molecular weights are obtained depending on the proportions of 1,6-hexanediol and diarylcarbonate used, always with removal of the calculated quantity of phenol by distillation. Polycarbonates of molecular weights from 800 to 3000 are preferred in the process according to the present invention, however, the most preferred polycarbonates have molecular weights of from about 1500 to about 2000. The hexanediol polycarbonate obtained is a pale wax which has a softening range of 38 to 52° C., depending on its molecular weight.

As already mentioned above, 1,6-hexanediol polycarbonates can be prepared by various methods, e.g. by reacting 1,6-hexanediol with phosgene or chloroformic acid esters. The reaction products obtained by such methods, however, still contain chlorine and have reduced functionality and so lead to polyurethanes of poor quality. If polycarbonates are prepared by the reaction of 1,6-hexanediol with dialkylcarbonates such as diethylcarbonate or ethylenecarbonate, the ester interchange may be carried out, as is well known, using alkaline or acid catalysts which, however, remain in the finished polycarbonates and again have an adverse effect on the quality of the polyurethanes produced. Only the reaction of 1,6-hexanediol with diarylcarbonates has been found to be suitable for preparing the 1,6-hexanediol polycarbonates for use in the process according to the invention.

Any suitable organic diisocyanate may be used in the preparation of polyurethane polymers in accordance with this invention such as, for example, butylene diisocyanate, hexamethylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, isomeric mixtures of 2,4- and 2,6-tolylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate and the like.

Any suitable chain extending agent may be used, such as, glycols, for example, 1,4-butanediol, 1,6-hexanediol, 2,3-butanediol, p-phenylene-di-b-hydroxyethyl ether, p-xylylene glycol and naphthalene-di-b-hydroxyethyl ether; unsaturated glycols which may be used for subsequent cross-linking reactions with sulfur, for example, glycerol monoallyl ether, dimethylol-dihydropyran and 1,4-butane-bis-N,N'-allyl-N,N'-b-hydroxyethyl urethane; glycols suitable for cross-linking reactions using formaldehyde, for example, m-dihydroxyethyl-toluidine; other cross-linking agents such as, 3,3'-dichloro-4,4'-diamino-diamino - diphenylmethane, diethyltoluylene diamine, m-xylylene diamine, water and the like. Preferably the chain extending agent has a molecular weight of less than 500.

The preparation according to the present invention of cross-linked polyurethanes can be carried out by those working-up methods commonly used in the production of elastomers, e.g. casting, spraying or roller processes. Cross-linking agents such as peroxide, sulfur or formaldehyde may, of course, also be used in these processes.

The invention is further illustrated by the following examples in which parts are by weight unless otherwise specified.

Preparation of hexanediol-(1,6)-polycarbonates as starting material (A) A mixture of about 1,303 parts of hexanediol-(1,6) and about 2,140 parts of diphenylcarbonate, is heated in a current of nitrogen. Phenol distills off at about 181° C. The temperature is gradually increased to 210 to 215° C., and a vacuum is applied after the reaction temperature has dropped and the phenol has largely distilled off. The remaining phenol residues are distilled off at an external temperature of 210 to 215° C. under a vacuum of 12 mm. Hg.

The melt is cooled to about 80° C. and is poured on to metal sheets. A pale wax of OH number 81 and softening point 40 to 41° C. is obtained. Yield: 1.5 kilograms.

(B) 1,265 parts of hexanediol and 2,140 parts of diphenylcarbonate are subjected to ester interchange under the conditions used under (A).

A pale wax of OH number 56 and softening point 46 to 47° C. is obtained.

Example 1

About 91 parts of 4,4'-diisocyanato-diphenylmethane are stirred at about 130° C. into about 200 parts of an anhydrous hexanediol-(1,6)-polycarbonate of OH number 81=2.45 percent OH prepared according to method (A).

After about 20 minutes, about 18 parts of butanediol-(1,4) are stirred into the melt at the same temperature, and the homogeneous mixture is poured into molds. The mixture becomes solid after about 20 minutes. It is then removed from the mold and the shaped articles are afterheated for 20 to 24 hours at about 100° C. An elastic product is obtained which has the following mechanical properties:

| | | After 14 days aging by hydrolysis at 70° C., 95% atmospheric moisture |
|---|---|---|
| Tensile strength, kg./cm.$^2$ | 234 | 208 |
| Elongation, percent | 373 | 387 |
| Permanent elongation, percent | 20 | 18 |
| Load at 300% elongation, kg./cm.$^2$ | 183 | 146 |
| Hardness | 86 | 85 |
| Elasticity | 33 | 33 |

Example 2

The following proportions of reactants are used, under the conditions described in Example 1, i.e., about 200 parts of hexanediol-(1,6)-polycarbonate of OH number 81 (according to method (A)), about 100 parts of 4,4'-diisocyanato-diphenylmethane and about 25.2 parts of butanediol-(1,4), an elastomer which has the following properties is obtained:

| | | After 14 days aging by hydrolysis at 70° C., 95% atmospheric moisture |
|---|---|---|
| Tensile strength, kg./cm.$^2$ | 239 | 242 |
| Elongation, percent | 383 | 387 |
| Permanent elongation, percent | 22 | 22 |
| Load at 300% elongation, kg./cm.$^2$ | 202 | 182 |
| Hardness | 86 | 89 |
| Elasticity | 28 | 29 |

Example 3

The following components and proportions are used under the conditions indicated in Example 1, i.e., about 200 parts of hexanediol-(1,6)-polycarbonate, OH number 81 (according to method (A)), about 69.4 parts of 1,5-naphthylene diisocyanate, about 14 parts of butanediol-(1,4), an elastomer which has the following properties is obtained:

| | | After 14 days aging by hydrolysis at 70° C., 95% atmospheric moisture |
|---|---|---|
| Tensile strength, kg./cm.$^2$ | 186 | 171 |
| Elongation, percent | 277 | 205 |
| Permanent elongation, percent | 30 | 18 |
| Load at 300% elongation, kg./cm.$^2$ | 140 | 141 |
| Hardness | 98 | 98 |
| Elasticity | 40 | 41 |

Example 4

About 180 parts of 1,5-naphthylene diisocyanate are introduced at about 128° C., with stirring, into about 100 parts of a hexanediol-(1,6)-polycarbonate of OH number 56 prepared by method B and dehydrated in vacuo at about 22 mm. Hg, and about 130° C. The homogeneous melt has a temperature of about 130° C. and after about 10 minutes it is mixed with about 20 parts of 1,4-butanediol within about 40 seconds using a propeller mixer. The mixture is filled into wax-lined molds at about 110° C. and solidifies therein within about 18 minutes to form shaped articles which are after-tempered for about 24 hours at about 110° C. The physical properties obtained are as follows:

| | | After 42 days hydrolysis by storage at 70° C. in 95% atmospheric moisture. |
|---|---|---|
| Tensile strength, kg./cm.² | 240 | 245 |
| Elongation at break, percent | 450 | 513 |
| Dimensional stability on 6 mm. ring in kg. abs. | 63 | 62 |
| Recoil elasticity, percent | 53 | 55 |
| Shore hardness A | 91 | 91 |
| Permanent elongation, percent | 15 | 21 |
| DIN abrasion | 21 | 22 |

After storage at about 80° C. in a commercial multipurpose oil wich normally vigorously attacks polyurethane elastomers, the swelling obtained after 16 days is 0.5 percent by weight, and the tensile strength is 234 kg. at an elongation at break of 470 percent. The Shore hardness remains unchanged.

Comparison example

An elastomer obtained in known manner from the formulation used in Example 4, but using a polyester of hexanediol and adipic acid instead of the polycarbonate polyester, and which is already known to yield products having an excellent resistance to hydrolysis, has the following physical properties:

| | | After 42 days storage at 70° C., 95% atmospheric moisture |
|---|---|---|
| Tensile strength, kg./cm.² | 290 | 110 |
| Elongation at break, percent | 470 | 570 |
| Dimensional stability on 6 mm. ring in kg. abs. | 52 | 18 |
| Recoil elasticity, percent | 41 | 36 |
| Shore hardness A | 90 | 83 |
| Permanent elongation, percent | 18 | 42 |
| DIN abrasion | 25 | 75 |

When stored in the same commercial oil as the product of Example 4, the swelling under the above-mentioned conditions is 4.8 percent and the tensile strength is 170 kg. at an elongation at break of 510 and a Shore hardness of 86.

Example 5

About 1,000 parts of a hexanediol polycarbonate of OH number 55 are mixed with about 61 parts of 1,4-butanediol at about 80° C. and immediately thereafter stirred with about 250 parts of 1,6-hexamethylene diisocyanate. The melt solidifies within about 5 minutes to produce a transparent elastic mass which is granulated in a cutting mill. The material may be worked up as a thermoplastic urethane elastomer in a conventional commercial injection molding apparatus in which it is plasticized in a screw, at a cylinder temperature of about 140° C. and nozzle temperature of about 160° C. The injection cycle lasts about 50 seconds and the finished articles have the following physical properties:

| | | After storage in water at 100° C. over 5 days |
|---|---|---|
| Tensile strength, kg./cm.² | 220 | 210 |
| Elongation at break, percent | 730 | 715 |
| Dimensional stability according to Graves, kg./cm. | 39 | |
| Shore hardness A | 89 | 85 |
| Recoil elasticity | 52 | |
| DIN abrasion | 45 | |

Example 6

About 1,000 parts of a hexanediol polycarbonate of OH number 56 are melted together with about 203 parts of hydroquinone dihydroxyethyl ether at about 150° C. and are then stirred together with about 400 parts of diphenylmethane diisocyanate-(4,4') at about 170° C. The melt solidifies within about 15 minutes to form a milky elastic mass which after cooling to room temperature, is cut up in a mill using beater knives. The product can be shaped by injection molding like a thermoplast. In this process, the cylinder temperature at the inlet portion to the nozzle should be 160, 170 or 180° C. The residence period in the mold is about 25 seconds. The physical properties are as follows:

| | | After storage in water at 80° C. for 3 weeks |
|---|---|---|
| Tensile strength, kg./cm.² | 270 | 215 |
| Elongation at break, percent | 520 | 580 |
| Shore hardness A | 88 | 86 |
| Recoil elasticity | 50 | |
| DIN abrasion | 46 | |

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:
1. A polyurethane polymer prepared by a process which comprises (1) transesterifying by heating together in the absence of solvent a diaryl carbonate with an excess of 1,6-hexanediol and removing the hydroxyaryl compound formed from the reaction mixture and (2) reacting the transesterification product with an organic diisocyanate and a chain extending agent containing hydrogen atoms which are reactive with NCO groups.

2. The polymer of claim 1 wherein the diarylcarbonate is diphenylcarbonate.

3. The polymer of claim 1 wherein the transesterification product has a molecular weight of from about 800 to about 3000.

4. The polymer of claim 1 wherein the transesterification product has a molecular weight of from about 1500 to about 2000.

5. The polymer of claim 1 wherein the chain extending agent has a molecular weight of less than 500.

References Cited

UNITED STATES PATENTS 2,999,844   9/1961   Mueller et al. _____ 260—47
3,022,272   2/1962   Schnell et al. _____ 260—47
3,110,686  11/1963   Newton _____ 260—2.5

DONALD E. CZAJA, Primary Examiner

H. S. COCKERAM, Assistant Examiner

U.S. Cl. X.R.

260—858